US007360175B2

(12) United States Patent
Gardner et al.

(10) Patent No.: US 7,360,175 B2
(45) Date of Patent: Apr. 15, 2008

(54) HIERARCHICAL, MULTILEVEL, EXPAND AND COLLAPSE NAVIGATION AID FOR HIERARCHICAL STRUCTURES

(75) Inventors: Douglas L. Gardner, Oxford, OH (US); Wendy D. Jacobs, Dayton, OH (US); Jason R. Bressler, Fairfield, OH (US); James C. Bancroft, Miamisburg, OH (US); Kavya Ramachandran, Dayton, OH (US); Kevin T. Ly, Springboro, OH (US)

(73) Assignee: LexisNexis, a division of Reed Elsevier Inc., Miamisburg, OH (US)

( * ) Notice: Subject to any disclaimer, the term of this patent is extended or adjusted under 35 U.S.C. 154(b) by 314 days.

(21) Appl. No.: 10/677,265

(22) Filed: Oct. 3, 2003

(65) Prior Publication Data

US 2005/0076312 A1 Apr. 7, 2005

(51) Int. Cl.
*G06F 3/048* (2006.01)
(52) U.S. Cl. ...................... 715/854; 715/825
(58) Field of Classification Search ............... 715/713, 715/808, 843, 854, 853, 514, 708, 810, 825
See application file for complete search history.

(56) References Cited

U.S. PATENT DOCUMENTS

| | | | |
|---|---|---|---|
| 5,065,347 A * | 11/1991 | Pajak et al. | 715/835 |
| 5,995,101 A | 11/1999 | Clark et al. | |
| 6,271,846 B1 | 8/2001 | Martinez et al. | |
| 6,341,280 B1 | 1/2002 | Glass et al. | |
| 6,380,957 B1 | 4/2002 | Banning | |
| 6,418,426 B1 | 7/2002 | Schlesinger | |
| 6,437,812 B1 | 8/2002 | Giles et al. | |
| 6,448,985 B1 | 9/2002 | McNally | |
| 6,462,762 B1 | 10/2002 | Ku et al. | |
| 6,484,190 B1 * | 11/2002 | Cordes et al. | 715/514 |
| 2003/0081013 A1 * | 5/2003 | Allen et al. | 345/853 |

OTHER PUBLICATIONS

Plaisant et al., "SpaceTree: Supporting Exploration In Large Node Link Tree, Design Evolution and Empirical Evaluation," *Proceedings of the IEEE Symposium on Information Visualization 2002* (2002), pp. 57-64.

* cited by examiner

*Primary Examiner*—Tadesse Hailu
*Assistant Examiner*—Namitha Pillai
(74) *Attorney, Agent, or Firm*—Jacobson Holman PLLC

(57) ABSTRACT

A software utility navigation aid for hierarchical structures such as file managers, taxonomies, or tables of contents that displays a dynamic menu when the mouse cursor is hovered over an activator used to swap the expanded/collapsed state of a node displayed in a hierarchical structure. The menu contains entries that identify in which display level of expansion the node resides based on the structure's fully collapsed condition (from the root node), the number of display levels to which this branch of the hierarchy can be expanded, and the number of nodes that will be exposed when this branch is expanded to each of those levels. Each displayed entry in this menu, positioned both below and above the identified node, can be clicked to cause the hierarchical structure to expand or collapse to that display level.

15 Claims, 2 Drawing Sheets ial menu, that when activated by a user provides infor-
HIERARCHICAL, MULTILEVEL, EXPAND AND COLLAPSE NAVIGATION AID FOR HIERARCHICAL STRUCTURES A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates to navigation aids for hierarchical structures such as file managers, taxonomies, or tables of contents.

BACKGROUND OF THE INVENTION

"Hierarchical structure" is used herein in the ordinary sense of a "tree," wherein there is only one route between any pair of nodes, and there is a notion of "toward top of the tree" (i.e. the root node, which is a node with no parent), and its opposite direction, toward a "leaf" or bottom node with no descendants, such that there are multiple levels of nodes, and no node can have more than one parent. Any node between the root node and a leaf node is referred to as an "intermediate node." Any path within the structure starts at the root node and progresses down an intermediate node at each lower level until it terminates at a leaf node. A tree with n nodes has n−1 branches in the path between the root node and a leaf node.

Hierarchical structures such as file managers, taxonomies, and tables of contents, and particularly large or complex hierarchical file structures, contain multiple levels of nodes (folders and subfolders). Conventionally, an expand/collapse icon is displayed to the left of each node's name. This icon shows a "+" symbol if the node is collapsed (that is, if the descendant nodes (which may be document folders or files) in the levels under it are hidden). Clicking the icon while the "+" symbol is displayed causes the descendant nodes in the level directly under that node to display. The icon then displays a "−" symbol. In a similar fashion, clicking the icon while the "−" symbol is displayed causes the node to collapse—the icon then displays the "+" symbol again. All descendant nodes displayed under the original node are collapsed until the "+" symbol displayed next to them is clicked.

In current multilevel hierarchies, a branch of that structure can be collapsed and individual nodes in the hierarchy can only be expanded to the next display level with a single action. Expanding a branch to multiple display levels requires multiple actions and no indication of the number of nodes that will be exposed at a given display level is provided.

It is to the solution of these and other problems to which the present invention is directed.

BRIEF SUMMARY OF THE INVENTION

It is therefore a primary object of the present invention to provide a navigation aid that allows a specific branch of a multilevel hierarchical structure to be expanded (or collapsed) multiple display levels with a single action.

It is another object of the present invention to allow a user to select any node in a multilevel hierarchy, to be aware of its position within the overall structure, to be aware of the number of items exposed at any lower level in that branch of the structure, and to quickly expand that node to any of those display levels.

These and other objects are achieved by provision of a software utility that comprises a navigation aid for hierarchical structures such as file managers, taxonomies, or tables of contents that displays a dynamic menu when the cursor is hovered over an activator used to swap the expanded!collapsed state of a node displayed in a hierarchical structure. The menu contains entries that identify in which display level of expansion the node resides based on the structure's fully collapsed condition (from the root node), the number of display levels to which this branch of the hierarchy can be expanded, and the number of nodes that will be exposed when this branch is expanded to each of those levels. Each displayed entry in this menu, positioned both below and above the identified node, can be clicked to cause the hierarchical structure to expand or collapse to that display level.

Other objects, features and advantages of the present invention will be apparent to those skilled in the art upon a reading of this specification including the accompanying drawings.

BRIEF DESCRIPTION OF THE DRAWINGS

The invention is better understood by reading the following Detailed Description of the Preferred Embodiments with reference to the accompanying drawing figures, in which like reference numerals, refer to like elements throughout, and in which.

DETAILED DESCRIPTION OF THE INVENTION

Figure 1:
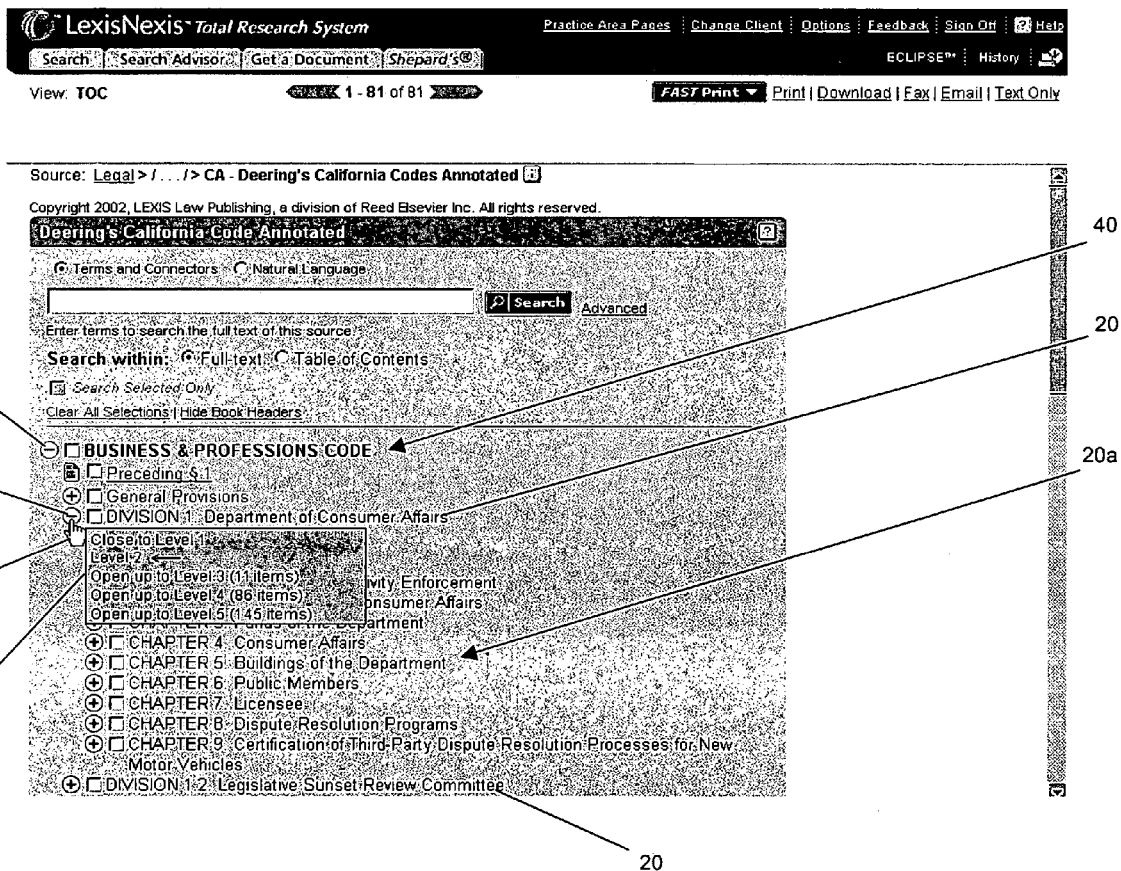
FIG. 1 shows a first embodiment of an expand collapse menu in accordance with the present invention displayed in connection with a table of contents.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

The multilevel expand/collapse software utility in accordance with the present invention is a navigation aid for hierarchical structures such as file managers, taxonomies, or tables of contents. It is particularly useful when used with large or complex hierarchical file structures containing multiple levels of nodes (e.g., folders and subfolders).

Figure 2:
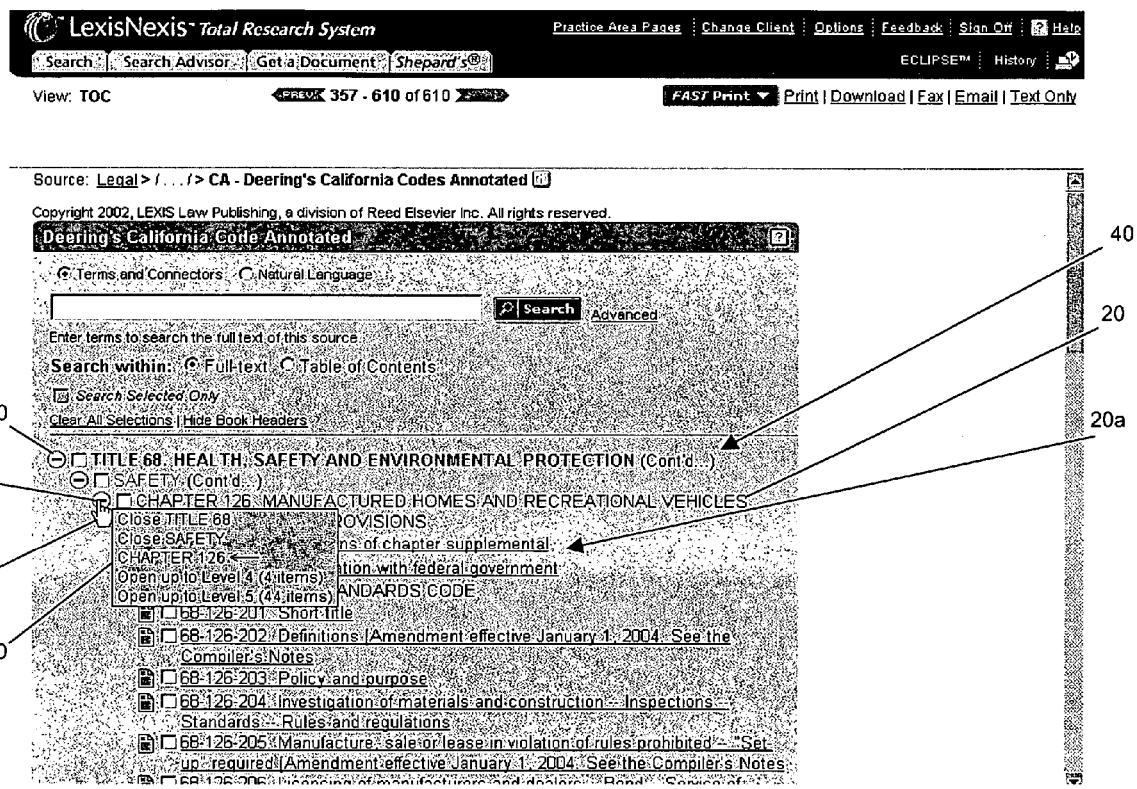
FIG. 2 shows a second embodiment of an expand collapse menu in accordance with the present invention displayed in connection with a table of contents.

As shown in FIGS. 1 and 2, in the multilevel expand/collapse navigation aid, a conventional expand/collapse icon 10 is displayed to the left of the name of each node 20 of a conventional, multilevel hierarchical structure 40. The expand/collapse icon 10 has the conventional expand/collapse icon features, wherein clicking the icon 10 next to a selected node 20' while the "+" symbol is displayed causes the descendant nodes 20a directly under the selected node 20' to display, and clicking the icon 10 while the "−" symbol is displayed causes the selected node 20' to collapse.

The multilevel expand/collapse navigation aid also provides an unobtrusive mechanism, in the form of a dynamically generated menu 30, that lets users easily expand or collapse a multilevel hierarchical structure 40 to a specific level of expansion. The menu 30 can be implemented as a Javascript layer to display expand/collapse options specific to the selected node 20'. However, as will be appreciated by those of ordinary skill in the art, the menu 30 can be created using technologies other than a Javascript layer, and the invention is not intended to be limited to a menu created using a Javascript layer.

Each individual node 20 of a hierarchy 40 can be expanded or collapsed to any level by hovering over the expandlcollapse icon 10 within the hierarchy 40 and selecting a target level. The multilevel expand/collapse navigation aid displays a dynamic menu 30 when the cursor 50 is hovered over an activator used to swap the expanded/collapsed state of a node 20 displayed in a hierarchical structure 40. The menu 30 consists of entries to close ancestors of the selected node 20', the selected node 20', and options to display the nodes at each descendent level of the hierarchy 40 below the selected node 20'. Each descendent level indicates the number of nodes that would be shown below the selected level 20', should the hierarchy 40 be opened to that level. The multilevel expand/collapse navigation aid thus saves the user from having either to expand the structure 40 by manually expanding multiple individual nodes 20 within that structure or to locate a specific parent node in order to collapse that branch of the structure.

As shown in FIGS. 1 and 2, if the cursor 50 is hovered over the icon 10 for a predetermined time (for example, 1.5 seconds) an expand/collapse menu 30 appears in the vicinity of the cursor 50, preferably below and to the right of the cursor 50. The hover duration may vary according to user preference. If the cursor 50 is too low on the screen for the entire menu 30 to be displayed below, then the menu 30 will display above and to the right of the cursor 50. The multi-level expand/collapse navigation aid will position the menu 30 so that the selected node 20' is visible either above or below the menu 30. For each expand option, the total number of nodes that would be visible under the selected node 20' if expanded to the selected level is visible next to the level to be expanded. The current level is selectable in the list, and will expand if currently collapsed, or collapse if currently expanded. Each selection in the menu 30 highlights' when the cursor 50 passes over it (commonly referred to as "mouseover" when the cursor is positioned using a mouse).

The expand/collapse menu 30 contains information that is generated dynamically after gathering statistics about the current state of the hierarchical structure 40 and then adjusting that information based on the position of the selected node 20' within that structure. This displayed menu 30 can then provide several functions:

The menu 30 identifies, by node name or level number, the path of parent nodes from the node to the selected node 20' (in FIG. 1,"close to Level 1"; in FIG. 2, "Close TITLE 68" and "Close SAFETY").

The menu 30 identifies at what level of expansion, within its path of the hierarchical structure 40, the selected node 20' resides (in FIG. 1, "Level 2"; in FIG. 2, "CHAPTER 126").

The menu 30 identifies how many additional levels this particular path of the hierarchical structure 40 can be expanded below the selected node (in FIG. 1, "Open to Level 3," "Open to Level 4," and "Open to Level 5"; in FIG. 2, "Open up to Level 4" and "Open up to Level 5").

The menu 30 identifies the total number of additional descendant nodes that will be displayed if the hierarchical structure 40 is expanded to a given level (in FIG. 1, for Level 3, "11 items," for Level 4, "86 items," and for Level 5, "145 items"; in FIG. 2, for Level 4, "4 items" and for Level 5, "44 items"). It is noted that in the user interfaces illustrated in FIGS. 1 and 2, "item" is used instead of the more technically-accepted term "node" because some users may not understand the term "node."

Each node in the menu 30 can be clicked to cause the screen to repaint, showing this path of the hierarchical structure 40 to be expanded or collapsed to the selected level of expansion. The current level node 20' is also selectable in the list, and clicking will toggle its state (open it if closed, close it if open).

In a basic embodiment, the multilevel expand/collapse navigation aid provides an unobtrusive, dynamically generated menu 30 that lets users easily expand or collapse a hierarchical structure 40 to a specific level of expansion. An example of such a menu 30, in conjunction with a conventional expand/collapse menu 40 generated by the LexisNexis Research System for the table of contents of Deering's California Codes Annotated, is shown in FIG. 1. In an enhanced embodiment, the multilevel expand/collapse navigation aid reports additional information about each level of the structure 40. An example of additional information is the precise specification of the node that would be closed by selecting that mode from the menu. An example of such a menu incorporating additional information, in conjunction with a conventional expand/collapse menu generated by the LexisNexis Research System for the table of contents of Deering's California Codes Annotated, is shown in FIG. 2.

Exemplary behavior for each menu option in the basic embodiment will now be described with reference to FIG. 1.

"+" symbol: The user clicks the "+" symbol to expand the selected hierarchy node 20' as in the conventional expand/collapse menu 40. The user hovers over the icon 10 associated with the selected node 20' for a predetermined time (e.g., 1.5 seconds) to see the dynamic expand/collapse menu 30.

"−" symbol: The user clicks "−" symbol to collapse the selected hierarchy node 20' as in the conventional expand/collapse menu 40. The user hovers over the icon 10 for a predetermined time to see the dynamic expand/collapse menu 30.

Rows to collapse (close) hierarchy (all rows above the entity): This menu option is displayed as "Close to Level n", where n is the hierarchy node that will be collapsed by choosing this option. The user selects this menu option to collapse the branch path of the hierarchy 40 containing the entity to the level selected. "Close Level 1" means collapse the root node of the hierarchy 40. "Close Level 2" means collapse the second level parent, etc. The resulting display is scrolled to target (the closed node).

Level of current entity: This menu option is displayed as "Level n", where n is the node 20' that generated the dynamic menu 30, and is indicated with some graphical or text element (in this case, an arrow ("←") symbol). This row of the menu is selectable and will toggle the expansion state of the node 20', opening the node if it is closed, closing it if it is open.

Rows to expand hierarchy (all rows below the entity): This menu option is displayed as "Open to Level n (x items)", where n is the lowest hierarchy node that will be shown by the action and x is the number of nodes below the current node which will be shown. The users select this menu option to expand the hierarchy 40 from the node 20' over which the cursor 50 is hovering (the current node) to the selected level.

Exemplary behavior for each menu option in the enhanced embodiment will now be described with reference to FIG. 2.

Close TITLE 68: lithe user selects this option from the dynamic menu 30, the path containing Title 68 will be closed to the first level. In this instance, the behavior would be the same as clicking the "–" icon for Title 68. The resulting Table of Contents display 4o is positioned to the node that was collapsed.

Close SAFETY: lithe user selects this option from the dynamic menu 30, the path of TITLE 68 containing Safety will be closed to the second level. In this instance, the behavior would be the same as clicking the "–" icon for Safety. The resulting Table of Contents display is positioned to Safety.

Chapter 126 : This is the current node 20' (the node that generated the dynamic menu). Selecting it will toggle its state, expanding the node if closed, collapsing it if open.

Open up to Level 4 (4 items): Clicking this option would expand Chapter 126 (at the 3rd level of the hierarchy) and display the 4th level under the chapter. In this case, there would be no effect, because Chapter 126 is already expanded to show the 4th level. If the 5th level were also shown, it would close.

Open up to Level 5 (44 items): Clicking this option would expand Chapter 126 to the 5th level, expanding the four nodes at the fourth level to display an additional 40 nodes (mostly documents).

Because the multilevel expand/collapse navigation aid can expand large sections of a hierarchy 40 with one request, it may require chunking rules to manage the display of very large, open hierarchies.

In an alternative embodiment, the multilevel expand/collapse navigation aid can be implemented using an image swap and a separate click as an alternative to a mouseover for showing the menu. The specific use of a mouseover versus a click event is not a critical element of the present invention.

It will be understood that the multilevel expand/collapse software utility can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions described above.

These computer program instructions may also be stored in a computer-readable memory that can direct a computer or other programmable data processing apparatus to function in a particular manner, such that the instructions stored in the computer-readable memory produce an article of manufacture including instruction means which implement the functions described above.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions described above.

Modifications and variations of the above-described embodiments of the present invention are possible, as appreciated by those skilled in the art in light of the above teachings. For example, the present invention could be applied to a file menu system. It is therefore to be understood that, within the scope of the appended claims and their equivalents, the invention may be practiced otherwise than as specifically described.

We claim:

1. A navigation aid for hierarchical structures having multiple levels of nodes, the navigational aid comprising:

hierarchy display means for displaying the nodes in a multilevel hierarchical structure, wherein nodes having ancestors can be collapsed to the level of any ancestor and nodes having descendants can be expanded to the level of any descendant;

icon display means for displaying in the vicinity of the name of each node a conventional expand-and-collapse icon used to swap the expanded and collapsed states of each node; and menu display means for gathering statistics about the current state of the hierarchical structure, for dynamically generating information from the statistics, for adjusting the information generated dynamically from the statistics based on the position of a selected node displayed in the hierarchical structure, and for displaying a dynamic menu associated with the selected node, wherein the dynamic menu is separate from the displayed nodes in the multilevel hierarchical structure and includes:

(a) for each ancestor level of the hierarchical structure above the selected node, an option to collapse the hierarchical structure to the level of the ancestor with a single action, based on the information generated dynamically from the statistics.

(b) an entry identifying the selected node and in which level of expansion from the root node the selected node resides, based on the fully collapsed condition of the hierarchical structure, and (c) for each descendant level of the hierarchical structure below the selected node, an option to display the nodes at the descendant level, based on the information generated dynamically from the statistics.

2. The navigation aid of claim 1, wherein the dynamic menu identifies, by one of node name and level number, the path of parent nodes from the root node, when the hierarchical structure is fully collapsed, to the selected node, based on the information generated dynamically from the statistics.

3. The navigation aid of claim 2, wherein the dynamic menu also identifies in what level of expansion, within the path, the selected node resides, based on the information generated dynamically from the statistics.

4. The navigation aid of claim 2, wherein the dynamic menu identifies to how many additional levels the path can be expanded. based on the information generated dynamically from the statistics.

5. The navigation aid of claim 1, wherein the dynamic menu identifies the total number of additional descendant nodes that will be displayed if the hierarchical structure is expanded to the selected node, based on the information generated dynamically from the statistics.

6. The navigation aid of claim 1, further comprising means for updating the display to show the path of the hierarchical structure to be expanded or collapsed to the selected level of expansion, based on the information generated dynamically from the statistics.

7. The navigation aid of claim 1, wherein the menu display means functions to display a dynamic menu associated with a node displayed in the hierarchical structure when the cursor is hovered over an activator used to swap the expanded-and-collapsed state of the node.

8. A computer program product for navigating hierarchical structures having multiple levels of nodes, the computer program product comprising a computer usable storage medium having computer readable program code embodied in the medium, the computer readable program code comprising:

computer readable program code means for displaying the nodes in a multilevel hierarchical structure, wherein nodes having ancestors can be collapsed to the level of any ancestor and nodes having descendants can be expanded to the level of any descendant;

computer readable program code means for displaying in the vicinity of each node's name a conventional expand-and-collapse icon used to swap the expanded and collapsed states of each node; and computer readable program code means for gathering statistics about the current state of the hierarchical structure, for dynamically generating information from the statistics, for adjusting the information generated dynamically from the statistics based on the position of a selected node displayed in the hierarchical structure, and for displaying a dynamic menu associated with a the selected node , wherein the dynamic menu is separate from the displayed nodes in the multilevel hierarchical structure and includes:

(a) for each ancestor level of the hierarchical structure above the selected node, an option to collapse the hierarchical structure to the level of the ancestor with a single action, based on the information generated dynamically from the statistics, (b) an entry identifying the selected node and in which level of expansion from the root node the selected node resides, based on the fully collapsed condition of the hierarchical structure, and (c) for each descendant level of the hierarchical structure below the selected node, an option to display the nodes at the descendant level, based on the information generated dynamically from the statistics.

9. The computer program product of claim 8, wherein the information identifies, by one of node name and level number, the path of parent nodes from the root node, when the hierarchical structure is fully collapsed, to the selected node.

10. The computer program product of claim 9, wherein the information also identifies in what level of expansion, within the path, the selected node resides.

11. The computer program product of claim 9, wherein the information identifies to how many additional levels the path can be expanded.

12. The computer program product of claim 8, wherein the information identifies the total number of additional descendant nodes that will be displayed if the hierarchical structure is expanded to the selected node.

13. The computer program product of claim 8, further comprising computer readable program code means for updating the display to show the path of the hierarchical structure to be expanded or collapsed to the selected level of expansion.

14. The computer program product of claim 8, wherein the computer readable program code means for displaying a dynamic menu functions to display a dynamic menu associated with a node displayed in the hierarchical structure when the cursor is hovered over an activator used to swap the expanded-and-collapsed state of the node.

15. A computer-implemented aid for navigating the display of a hierarchical structure having multiple levels of nodes, wherein nodes having ancestors can be collapsed to the level of any ancestor and nodes having descendants can be expanded to the level of any descendant, and wherein a conventional expand-and-collapse icon used to swap the expanded and collapsed states of each node is displayed in association with each node, the navigational aid comprising:

means for gathering statistics about the current state of the hierarchical structure;

means for dynamically generating information from the statistics, means for adjusting the information generated dynamically from the statistics based on the position of a selected node displayed in the hierarchical structure, and means for displaying a dynamic menu associated with the selected node, wherein the dynamic menu is separate from the displayed nodes in the multilevel hierarchical structure and includes:

(a) for each ancestor level of the hierarchical structure above the selected node, an option to collapse the hierarchical structure to the level of the ancestor with a single action, based on the information generated dynamically from the statistics, (b) an entry identifying the selected node and in which level of expansion from the root node the selected node resides, based on the fully collapsed condition of the hierarchical structure, and (c) for each descendant level of the hierarchical structure below the selected node, an option to display the nodes at the descendant level, based on the information generated dynamically from the statistics.

* * * * *